United States Patent
Pang (10) Patent No.: US 10,277,151 B2
(45) Date of Patent: Apr. 30, 2019

(54) APPARATUS FOR DRIVING ACTUATOR (71) Applicant: SAMSUNG ELECTRO-MECHANICS CO., LTD., Suwon-si (KR)

(72) Inventor: Sung Man Pang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/794,289

(22) Filed: Oct. 26, 2017

(65) Prior Publication Data
US 2018/0287530 A1 Oct. 4, 2018

(30) Foreign Application Priority Data
Mar. 31, 2017 (KR) .................. 10-2017-0041602

(51) Int. Cl.
H02K 41/00 (2006.01)
H02P 7/025 (2016.01)
H02P 25/034 (2016.01)
H02K 41/035 (2006.01)
H02K 11/33 (2016.01)

(52) U.S. Cl.
CPC ............ *H02P 7/025* (2016.02); *H02P 25/034* (2016.02); *H02K 11/33* (2016.01); *H02K 41/0356* (2013.01)

(58) Field of Classification Search
CPC ............... H02P 7/29; H02P 7/28; H02P 7/292
See application file for complete search history.

(56) References Cited

U.S. PATENT DOCUMENTS

2009/0322298 A1* 12/2009 Nishida ............... H02M 3/1588
323/282
2015/0264237 A1 9/2015 Kang

FOREIGN PATENT DOCUMENTS

| JP | 8-340694 A | 12/1996 |
| JP | 2000-510677 A | 8/2000 |
| KR | 10-2015-0106734 A | 9/2015 |
| WO | WO 97/41558 A1 | 11/1997 |

* cited by examiner

*Primary Examiner* — Karen Masih
(74) *Attorney, Agent, or Firm* — NSIP Law (57) ABSTRACT

An apparatus for driving an actuator includes a driving coil configured to generate magnetic force depending on driving signals, a control circuit configured to provide a first control signal and a second control signal, and a driving circuit including a high-side switch and a low-side switch connected to the driving coil, the high-side switch and the low-side switch configured to generate the driving signals based on the first and second control signals, respectively, and to provide the driving signals to the driving coil, wherein the control circuit is further configured to control the driving circuit so that the high-side switch is operated as a current source using the first control signal, and to control the driving circuit so that the low-side switch is driven in a pulse width modulation (PWM) scheme using the second control signal.

17 Claims, 8 Drawing Sheets

APPARATUS FOR DRIVING ACTUATOR

CROSS-REFERENCE TO RELATED APPLICATION(S)

This application claims the benefit under 35 USC § 119(a) of Korean Patent Application No. 10-2017-0041602 filed on Mar. 31, 2017 in the Korean Intellectual Property Office, the entire disclosure of which is incorporated herein by reference for all purposes.

BACKGROUND

1. Field

The following description relates to an apparatus driving an actuator.

2. Description of Related Art

A voice coil motor (VCM) is a small driving motor that generates magnetic force by an input current and changes a position of a target object to be controlled by the magnetic force. The VCM is used in several applications. For example, the VCM may be mounted in a small camera module installed in an electronic device, such as, a smartphone, camera, smart home/building environment, to control a position of a small lens. In this application, the VCM may be used in an auto-focus (AF) actuator, an optical image stabilization (OIS) actuator, a zoom actuator, or the like.

With the miniaturization of camera modules and reductions in power consumed by camera modules, the VCM has been miniaturized and power consumed in the VCM has been reduced. With the miniaturization of the VCM, a circuit driving the VCM also needs to be optimized based on features, such as, size, power efficiency improvement, and the like.

A linear scheme or a pulse width modulation (PWM) scheme may be used in order to drive the VCM. The linear scheme is a scheme in which an input signal and a current output are in linear proportion to each other, and the PWM scheme is a scheme in which a driving switch is repeatedly switched on and off, depending on a PWM-type input signal to maintain an average current flowing to a coil depending on PWM, thereby driving the VCM.

A control is easier in the linear scheme since a relationship between an input and an output is linear and noise does not exist since a direct current (DC) current is supplied to the VCM. But, the linear scheme has a disadvantage in that power consumption is greater as compared to the PMW scheme.

In the PWM scheme power consumption is only generated during a duty in which a current is supplied to an inductor (a coil) and is not generated when a current stored in the inductor flows. But, the PWM scheme has a disadvantage in that a current ripple from switching-on/off exists on the basis of an average current flowing to the inductor. Therefore, in the PWM scheme, accuracy of an output current may be lower as compared to the linear scheme, and noise is generated due to a switching scheme.

In the PWM scheme, a discontinuous current mode (DCM) section in which linearity between an input signal and an output signal is very low exists in a low current region.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for driving an actuator, including a driving coil configured to generate magnetic force depending on driving signals, a control circuit configured to provide a first control signal and a second control signal, and a driving circuit including a high-side switch and a low-side switch connected to the driving coil, the high-side switch and the low-side switch configured to generate the driving signals based on the first and second control signals, respectively, and to provide the driving signals to the driving coil, wherein the control circuit is further configured to control the driving circuit so that the high-side switch is operated as a current source using the first control signal, and to control the driving circuit so that the low-side switch is driven in a pulse width modulation (PWM) scheme using the second control signal.

The control circuit may include a gate signal generating circuit configured to generate the first control signal and the second control signal based on first and second input signals, and a detecting circuit configured to detect feedback signals corresponding to the driving signals flowing to the driving coil and to provide the feedback signals to the gate signal generating circuit, and the gate signal generating circuit may be configured to control the first control signal and the second control signal based on the feedback signals.

The control circuit may be configured to set a voltage level of the first control signal based on the feedback signal within a current source condition range to operate the high-side switch as the current source.

The control circuit may be configured to provides the second control signal as a PWM signal to drive the low-side switch in the PWM scheme, and a period and a duty of the PWM signal may be constant.

The detecting circuit may include a mirror switch connected to the high-side switch in a current mirror form, and a detecting resistor connected between the mirror switch and a ground and detecting the feedback signal.

The gate signal generating circuit may include a first multiplexer configured to generate the first control signal on the basis of an error voltage between a reference voltage corresponding to the first input signal and the feedback signal, and a second multiplexer configured to generate the second control signal on the basis of a second input signal having a constant period and duty.

In another general aspect, there is provided an apparatus for driving an actuator, including a driving coil configured to generate magnetic force depending on driving signals, a control circuit configured to provide a first control circuit including first and second gate signals and a second control signal including third and fourth gate signals, and a driving circuit including a first high-side switch, a second high-side switch, a first low-side switch, and a second low-side switch connected to the driving coil, the first and second high-side switches and the first and second low-side switches being configured to generate the driving signals depending on the first and second control, and to provide the driving signals to the driving coil, wherein the control circuit is further configured to control the driving circuit so that one of the first and second high-side switches is operated as a current source using the first control signal, and to control the driving circuit so that one of the first and second low-side switches is driven in a pulse width modulation (PWM) scheme using the second control signal.

The control circuit may include a gate signal generating circuit configured to generate the first control signal and the second control signal, and a detecting circuit configured to detect first and second feedback signals corresponding to the driving signals flowing to the driving coil and to provide the first and second feedback signals to the gate signal generating circuit, and the gate signal generating circuit may be configured to control the first control signal and the second control signal depending on the first and second feedback signals.

The control circuit may be configured to set a voltage level of the first control signal depending on one of the first and second feedback signals within a current source condition range to operate one of the first and second high-side switches as the current source.

The control circuit may be configured to provide the second control signal as a PWM signal to drive one of the first and second low-side switches in the PWM scheme.

The detecting circuit may include first and second mirror switches connected, respectively, to the first and second high-side switches in a current mirror form, and first and second detecting resistors connected, respectively, between the first and second mirror switches and a ground and being configured to detect, respectively, the first and second feedback signals corresponding to the driving signals.

The gate signal generating circuit may include a first multiplexer configured to generate the first control signal based on an error voltage between one of the first and second feedback signals and a reference voltage, a second multiplexer configured to generating the second control signal based on the a second input signal having a constant period and duty, a digital to analog converter (DAC) configured to provide the reference voltage corresponding to a first input signal, a third multiplexer configured to provide one of the first and second feedback signals, and an operational amplifier configured to provide an error voltage between the feedback signal selected by the third multiplexer and the reference voltage from the DAC to the first multiplexer.

The first high-side switch and the first low-side switch may be connected in series between a first power supply voltage terminal and a second power supply voltage terminal.

The second high-side switch and the second low-side switch may be connected in series between the first power supply voltage terminal and the second power supply voltage terminal.

A first end of the driving coil may be connected to a first connection node between the first high-side switch and the first low-side switch, and a second end of the driving coil may be connected to a second connection node between the second high-side switch and the second low-side switch.

The first power supply voltage terminal may have a positive voltage and the second power supply voltage terminal may have a negative or zero voltage.

The first and second gate signals may have complementary voltage levels and the third and fourth gate signals may have complementary voltage levels.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough an understanding of the disclosure of this application. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known in the art maybe omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or wafer (substrate), is described as being "on," "connected to," or "coupled to" another element, it can be directly "on," "connected to," or "coupled to" the other element, or there may be other elements intervening therebetween. In contrast, when an element is referred to as being "directly on," "directly connected to," or "directly coupled to" another element, there can be no other elements or layers intervening therebetween. As used herein, the term "and/or" includes any and all combinations of one or more of the associated listed items.

Although terms such as "first," "second," and "third" maybe used herein to describe various members, components, regions, layers, and/or sections, these members, components, regions, layers, and/or sections are not to be limited by these terms. Rather, these terms are only used to distinguish one member, component, region, layer, or section from another member, component, region, layer, or section. Thus, a first member, component, region, layer, or section referred to in an example below could also be referred to as a second member, component, region, layer, or section without departing from the teachings of the example.

Spatially relative terms, such as "above," "upper," "below," and "lower," may be used herein for ease of description to describe one element's relationship to another element as shown in the figures. Such spatially relative terms are intended to encompass different orientations of the device in use or operation in addition to the orientation depicted in the figures. For example, if the device in the figures is turned over, elements described as "above" or "upper" relative to other elements would then be oriented "below" or "lower" relative to the other elements. Thus, the term "above" can encompass both the above and below orientations depending on a particular direction of the figures. The device may be otherwise oriented (rotated 90 degrees or at other orientations), and the spatially relative terms used herein are to be interpreted accordingly.

The terminology used herein is for describing particular examples only, and is not intended to limit the disclosure. The terms "a," "an," and "the" include the plural forms as well, unless the context clearly indicates otherwise. As used herein, the term "and/or" includes any one and any combination of any two or more of the associated listed items.

Due to manufacturing techniques and/or tolerances, Variations of the shapes shown in the drawings maybe occur. Thus, the examples described below are not to be construed as being limited to the particular shapes of regions shown in the drawings, but include changes in shape occurring during manufacturing.

Figure 1:
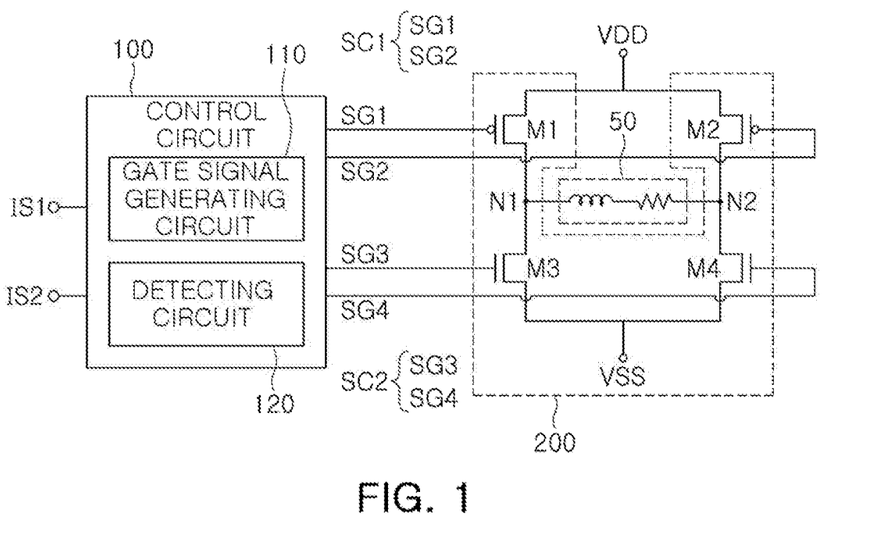
FIG. 1 is a diagram illustrating an example of an apparatus for driving an actuator.

FIG. 1 is a diagram illustrating an example of an apparatus for driving an actuator.

Referring to FIG. 1, the apparatus for driving an actuator includes a driving coil 50, a control circuit 100, and a driving circuit 200.

In an example, the driving coil 50 generates magnetic force depending on driving signals generated by the driving circuit 200.

As an example, when the apparatus for driving an actuator is used in a camera module, the magnetic force of the driving coil 50 may move a lens barrel included in the camera module, including lenses, and having a magnetic member disposed therein.

In an example, the control circuit 100 provides a first control signal SC1 and a second control signal SC2 on the basis of first and second input signals IS1 and IS2.

In an example, the first control signal SC1 includes first and second gate signals SG1 and SG2 having complementary voltage levels, and the second control signal SC1 includes third and fourth gate signals SG3 and SG4 having complementary voltage levels.

In an example, when each of the first gate signal SG1 and the fourth gate signal SG4 is an active level, each of the second gate signal SG2 and the third gate signal SG3 may be a non-active state. In another example, when each of the second gate signal SG2 and the third gate signal SG3 is an active level, each of the first gate signal SG1 and the fourth gate signal SG4 may be a non-active state.

In an example, the driving circuit 200 includes first and second high-side switches M1 and M2 and first and second low-side switches M3 and M4 that are connected to the driving coil 50.

In an example, the first and second high-side switches M1 and M2 are P-channel metal oxide semiconductor (PMOS) transistors, and the first and second low-side switches M3 and M4 are N-channel metal oxide semiconductor (NMOS) transistors. Hereinafter, the first and second high-side switches M1 and M2 are the PMOS transistors and the first and second low-side switches M3 and M4 are NMOS transistors for convenience of explanation. However, other types of the first and second high-side switches M1 and M2 and the first and second low-side switches M3 and M4 are considered to be well within the scope of the present disclosure As an example, the first high-side switch M1 and the first low-side switch M3 may be connected to each other in series between a first power supply voltage (VDD) terminal and a second power supply voltage (VSS) terminal. The second high-side switch M2 and the second low-side switch M4 may be connected to each other in series between the first power supply voltage (VDD) terminal and the second power supply voltage (VSS) terminal. In an example, a first power supply voltage VDD may be a positive voltage, and the second power supply voltage may be a zero voltage or a negative voltage.

The driving coil 50 may have one end connected to a first connection node N1 between the first high-side switch M1 and the first low-side switch M3 and the other end connected to a second connection node N2 between the second high-side switch M2 and the second low-side switch M4.

In an example, the control circuit 100 includes a gate signal generating circuit 110 and a detecting circuit 120.

In an example, the detecting circuit 120 detects first and second feedback signals FB1 and FB2 (see FIG. 4) corresponding to driving signals flowing in the driving coil 50 and provide the first and second feedback signals FB1 and FB2 to the gate signal generating circuit 110.

Figure 4:
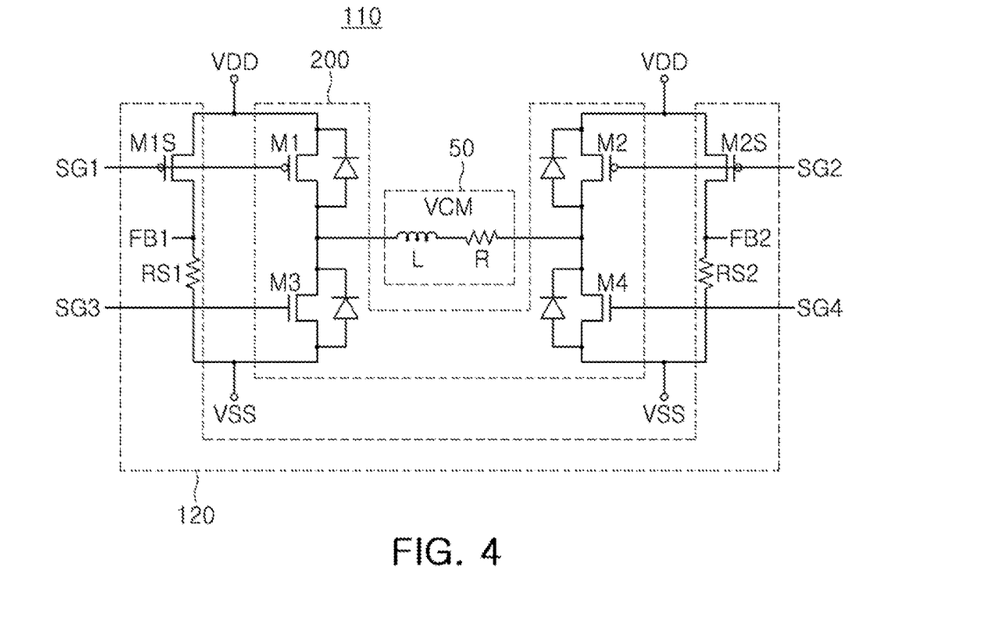
FIG. 4 is a diagram illustrating an example of a detecting circuit.

In an example, the gate signal generating circuit 110 controls the first control signal SC1 and the second control signal SC2 depending on the first and second feedback signals FB1 and FB2 (see FIG. 4).

In the drawing FIGS., the description for components denoted by the same reference numerals will be omitted. The description of a component denoted by a reference number is applicable the component displayed in all FIG. 2, thus, the description may not be repeated.

Figure 2:
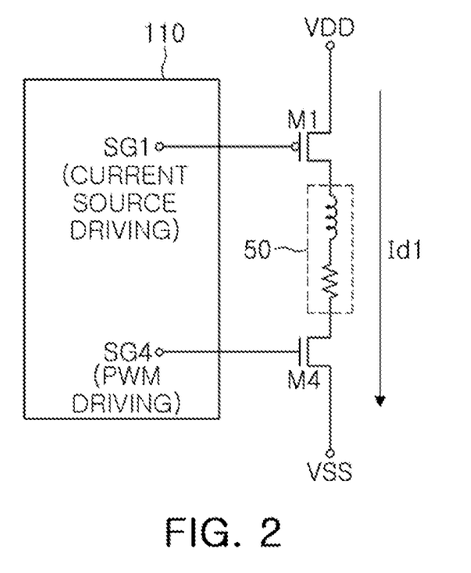
FIG. 2 is a diagram illustrating an example of an apparatus for driving an actuator.
Figure 3:
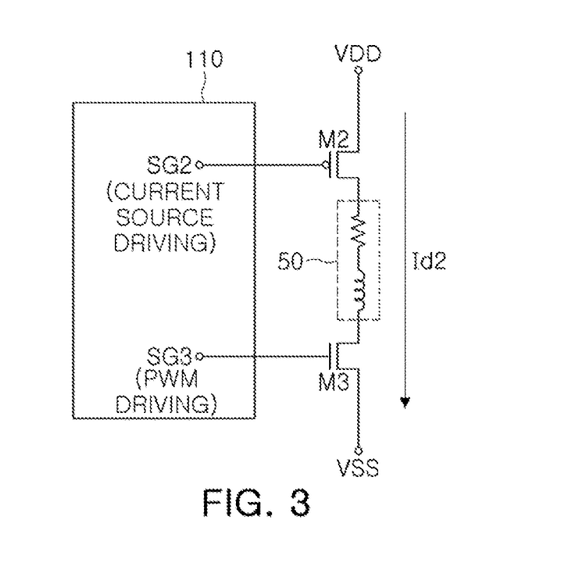
FIG. 3 is a diagram illustrating an example of an apparatus for driving an actuator.

FIG. 2 is a diagram illustrating an example of an apparatus for driving an actuator, and FIG. 3 is a diagram illustrating another example of an apparatus for driving an actuator.

Referring to FIGS. 1 through 3, in an example, the control circuit 100 controls the driving circuit so that one of the first and second high-side switches M1 and M2 is operated as a current source using the first control signal SC1. The control circuit 100 controls the driving circuit so that one of the first and second low-side switches M3 and M4 is driven in a pulse width modulation (PWM) scheme using the second control signal SC2.

Referring to FIGS. 1 and 2, in an example, the control circuit 100 controls the driving circuit so that the first high-side switch M1 is operated as the current source using the first gate signal SG1 included in the first control signal SC1. The control circuit 100 controls the driving circuit so that the second low-side switch M4 is operated in the PWM scheme using the fourth gate signal SG4 included in the second control signal SC2.

In an example, the second gate signal SG2 included in the first control signal SC1 and the third gate signal SG3 included in the second control signal SC2 may be a non-active level. Therefore, the second high-side switch M2 and the first low-side switch M3 may be in a switch-off state.

In an example, the first high-side switch M1 and the second low-side switch M4 generates driving signals depending on the first and fourth gate signals SG1 and SG4, respectively, and provides the driving signals to the driving coil 50. As an example, the driving signals supplied to the driving coil 50 is a current Id1 flowing from the first power supply voltage (VDD) terminal to the second power supply voltage (VSS) terminal.

Referring to FIGS. 1 and 3, in an example, the control circuit 100 controls the driving circuit so that the second high-side switch M2 is operated as the current source using the second gate signal SG2 included in the first control signal SC1. The control circuit 100 controls the driving circuit so that the first low-side switch M3 is driven in the PWM scheme using the third gate signal SG3 included in the second control signal SC2.

In an example, the first gate signal SG1 included in the first control signal SC1 and the fourth gate signal SG4 included in the second control signal SC2 are of a non-active level. Therefore, the first high-side switch M1 and the second low-side switch M4 may be in a switch-off state.

Therefore, the second high-side switch M2 and the first low-side switch M3 may generate driving signals depending on the second and third gate signals SG2 and SG3, respectively, and may provide the driving signals to the driving coil 50. As an example, the driving signals supplied to the driving coil 50 may be a current Id2 flowing from the first power supply voltage (VDD) terminal to the second power supply voltage (VSS) terminal.

When the first and second high-side switches M1 and M2 are the PMOS transistors, a condition under which the PMOS transistor is operated as the current source is represented by the following Equation 1:

$$Vgs \leq Vds + Vth \quad \text{[Equation 1]}$$

Here, Vgs is a gate-source voltage of the PMOS transistor, Vds is a drain-source voltage of the PMOS transistor, and Vth is a threshold voltage of the PMOS transistor.

As an example, as the condition under which the PMOS transistor is operated as the current source, Vgs may be a voltage exceeding a zero voltage and equal to or less than 1V when Vds is 0.2V and Vth is 0.8V.

FIG. 4 is a diagram illustrating an example of a detecting circuit.

Referring to FIG. 4, in an example, the detecting circuit 120 includes first and second mirror switches M1S and M2S and first and second detecting resistors RS1 and RS2.

Each of the first and second mirror switches M1S and M2S may be connected to each of the first and second high-side switches M1 and M2 in a current mirror form, such that a current corresponding to a current flowing to each of the first and second high-side switches M1 and M2 may flow through each of the first and second mirror switches M1S and M2S.

In an example, each of the first and second detecting resistors RS1 and RS2 is connected between each of the first and second mirror switches M1S and M2S and a ground to detect the first and second feedback signals FB1 and FB2.

In an example, when a size ratio between the first mirror switch M1S and the first high-side switch M1 is 1:N, a current corresponding to 1/N of the current flowing to the first high-side switch M1 may flow to the first mirror switch M1S. In addition, when a size ratio between the second mirror switch M2S and the second high-side switch M2 is 1:N, a current corresponding to 1/N of the current flowing to the second high-side switch M2 may flow to the second mirror switch M2S.

In an example, the first and second mirror switches M1S and M2S may be PMOS transistors.

In an example, the control circuit 100 controls a voltage level of the first control signal SC1 depending on the first and second feedback signals FB1 and FB2 within a current source condition range as represented by Equation 1 so that one of the first and second high-side switches M1 and M2 is operated as the current source.

In an example, the control circuit 100 provides the second control signal SC2 as a PWM signal so that one of the first and second low-side switches M3 and M4 is driven in the PWM scheme. As an example, the second control signal SC2 may be a PWM signal of which a period and a duty are constant. In another example, a duty and a period of the PWM signal may be varied without departing from the spirit and scope of the illustrative examples described.

Figure 5:
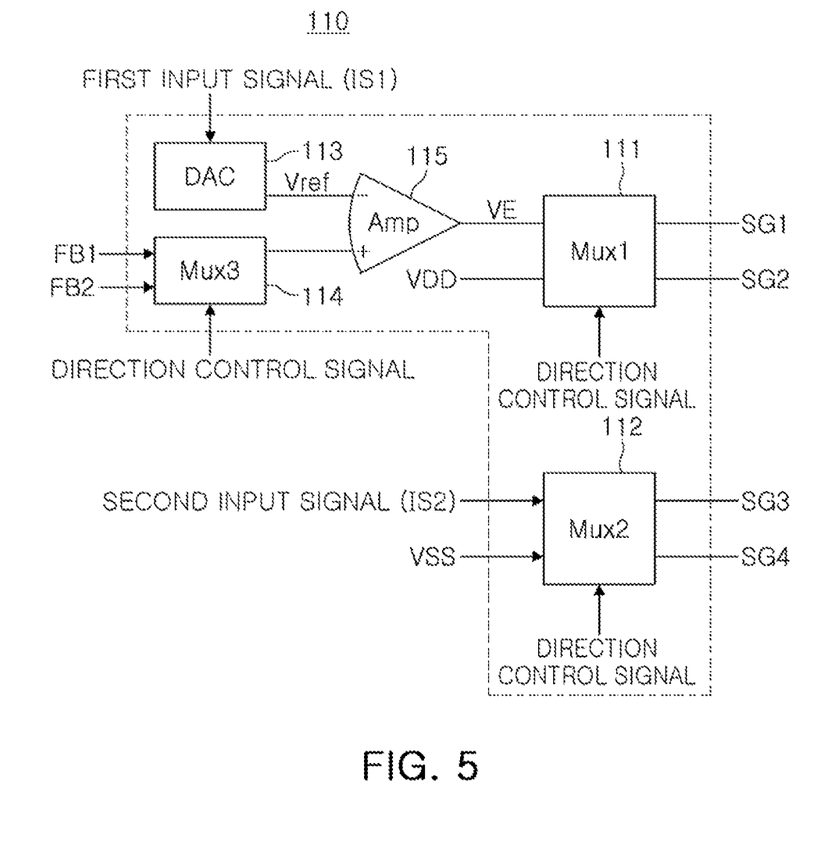
FIG. 5 is a diagram illustrating an example of a gate signal generating circuit.

FIG. 5 is a diagram illustrating an example of a gate signal generating circuit.

Referring to FIG. 5, in an example, the gate signal generating circuit 110 includes a first multiplexer 111, a second multiplexer 112, a digital to analog converter (DAC) 113, a third multiplexer 114, and an operational amplifier 115.

In an example, the first multiplexer 111 generates the first control signal SC1 on the basis of an error voltage VE between one of the first and second feedback signals FB1 and FB2 and a reference voltage Vref and a direction control signal.

In an example, during a period in which a driving current flows from the first high-side switch M1 to the second low-side switch M2, the first multiplexer Mux1 111 provides the error voltage VE as the first gate signal SG1 so that the first high-side switch M1 is operated as the current source, and provides the first power supply voltage VDD as the second gate signal SG2 so that the second high-side switch M2 is in a switch-off state.

In an example, when a driving direction of the actuator (for example, a voice coil motor (VCM)) is changed, i.e., during a period in which a current flows from the second high-side switch M2 to the first low-side switch M3, the first multiplexer 111 may change signals by the direction control signal to provide the error voltage VE as the second gate signal SG2 so that the second high-side switch M2 is operated as the current source and provide the first power supply voltage VDD as the first gate signal SG1 so that the first high-side switch M1 is in a switch-off state.

In an example, the second multiplexer 112 generates the second control signal SC2 on the basis of the second input signal IS2, which has a constant period and duty.

In an example, the DAC 113 provides the reference voltage Vref corresponding to the first input signal IS1.

The third multiplexer 114 is provided the first and second feedback signals FB1 and FB2. In an example, the third multiplexer 114 selects one of the first and second feedback signals FB1 and FB2 on the basis of a direction control signal, and provides the selected feedback signal to a non-inverting input terminal of the operational amplifier 115.

In an example, the operational amplifier 115 provides the error voltage VE between the feedback signal selected by the third multiplexer 114 and input to the non-inverting input terminal of the operational amplifier 115, and the reference voltage Vref input from the DAC 113 to an inverting input terminal thereof to the first multiplexer 111.

In an example, the first operational amplifier 115 amplifies a voltage difference between the reference voltage Vref and the feedback signal FB1 or FB2 selected by the third multiplexer 114 to provide the error voltage VE as the first gate signal SG1 of the first high-side switch M1. In an example, the reference voltage Vref input to the inverting input terminal of the operational amplifier 115 is generated by the DAC 113. For example, the reference voltage Vref of 0.4V is generated when the first input signal SI1 is 00 (two bits), the reference voltage Vref of 0.8V is generated when the first input signal SI1 is 01, the reference voltage Vref of 1.2V is generated when the first input signal SI1 is 10, and the reference voltage Vref of 1.6V is generated when the first input signal SI1 is 11.

Figure 6:
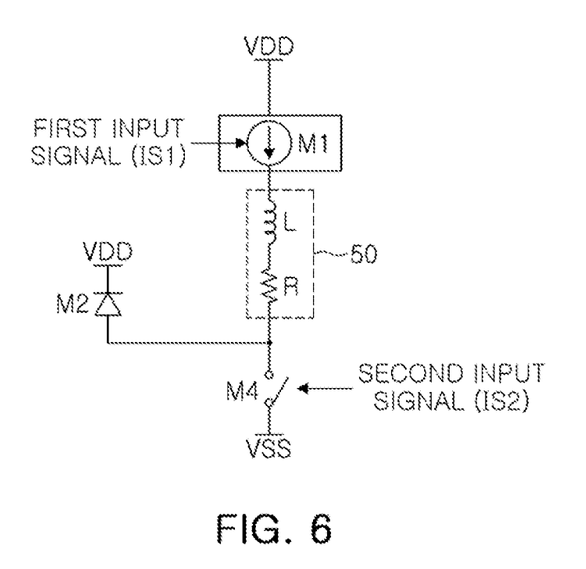
FIG. 6 is a diagram illustrating an example of an apparatus for driving an actuator.

FIG. 6 is a diagram illustrating an example of an apparatus for driving an actuator.

Referring to FIGS. 1 through 6, through an operation process of the gate signal generating circuit 110, the gate signal generating circuit 110 in FIG. 5 may control the driving circuit to operate in a linear operation using the first gate signal SG1 generated from the first multiplexer 111 based on the error voltage VE output from the operational amplifier 115. The gate signal generating circuit 110 in FIG. 5 may control the driving circuit to operate in a PWM operation using the fourth gate signal SG4 generated from the second multiplexer 112 based on the second input signal IS2 of which the period and the duty are constant.

In an example, when the driving current flows from the first high-side switch M1 to the second low-side switch M4, the second multiplexer Mux2 112 (see FIG. 5) provides the PWM signal included in the second input signal IS2 as the fourth gate signal SG4 and provide the second power supply voltage VSS as the third gate signal SG3. In an example, when the driving direction of the actuator (for example, the VCM) is changed, i.e., during the period in which the current flows from the second high-side switch M2 to the first low-side switch M3, the second multiplexer Mux2 112 (see FIG. 5) changes signals by a direction control signal to provide the PWM signal included in the second input signal IS2 as the third gate signal SG3 and provide the second power supply voltage VSS as the fourth gate signal SG4.

In an example, the first and second input signals IS1 and IS2 may be generated in a digital logic circuit.

Figure 7A:
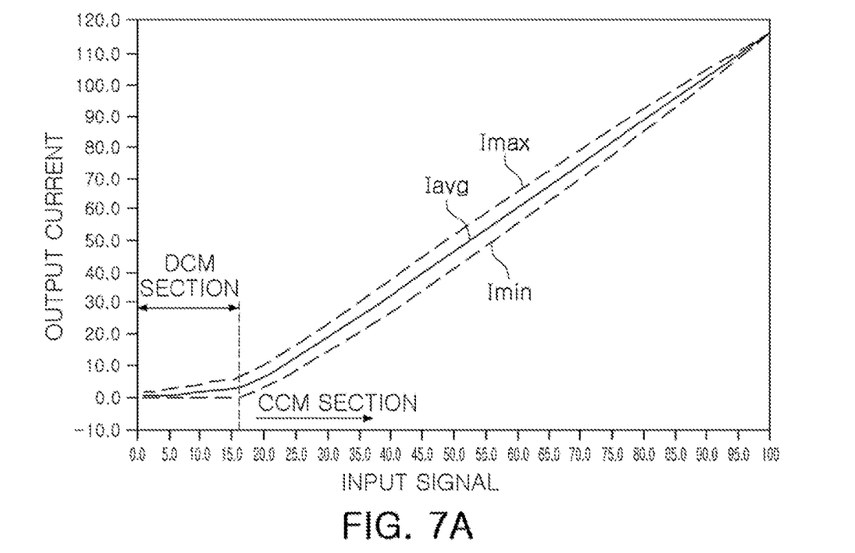
FIG. 7A is an example of waveform diagrams of input signal-output current in a pulse width modulation (PWM) scheme.
Figure 7B:
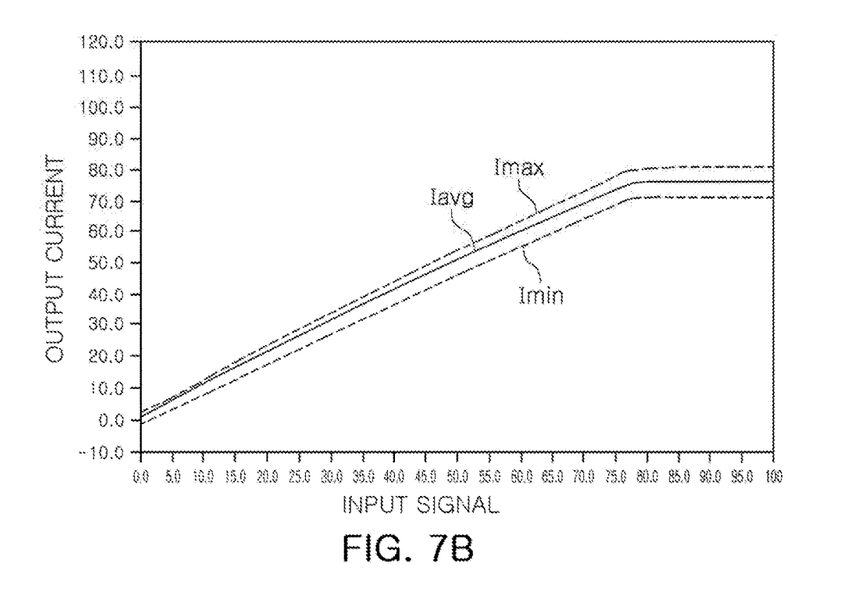
FIG. 7B is waveform diagrams of input signal-output current in a driving scheme according to an example described herein.

FIG. 7A is an example of waveform diagrams of input signal-output current in a PWM scheme, and FIG. 7B is waveform diagrams of input signal-output current in a driving scheme according to an example described herein.

Referring to FIG. 7A, an input signal is a duty of a PWM signal and is represented in a range of 0 to 100%, the first high-side switch M1 of FIG. 6 is a simple switch and is operated in a switch-on state, and the second low-side switch M4 is a switch repeating switch-on/off operations and is repeatedly switched on/off depending on a PWM-type input signal.

In this case, a change in the driving current flowing to the driving coil 50 of the VCM over time appears in a form of a sawtooth wave. In such a sawtooth wave, an amount of current may be changed from a minimum current Imin to a maximum current Imax when the second low-side switch M4 is in a switch-on state. When an amount of current is changed from the maximum current Imax to the minimum current Imin, the second low-side switch M4 may be in a switch-off state and the driving current stored in the driving coil 50 may flow to the first power supply voltage (VDD) terminal through the second high-side switch M2.

The PWM scheme as described above may be a scheme of controlling an average current Iavg to coincide with a target value by charging and discharging a current in and from the driving coil 50.

In an example, the average current flowing to the driving coil 50 may be operated in a continuous current mode (CCM) in which a current actually flowing to the driving coil 50 does not become 0, such that the average current may be an average value between the maximum current and the minimum current, i.e., Iavg=(Imax+Imin)/2). On the other hand, in a linear scheme, switching does not exist, and a driving current that is in proportion to an input signal may be the same as the average current Iavg.

However, referring to FIGS. 6 and 7A, in the PWM scheme, a region in which linearity between a duty of an input signal and output current characteristics is very low appears in a region in which the average current Iavg is small, which causes a problem that a discontinuous current mode (DCM) corresponding to a region in which the current flowing to the driving coil 50 drops up to zero is generated.

Referring to FIGS. 6 and 7B, in the driving circuit 200 described above, the first high-side switch M1 may be operated as the current source on the basis of the first input signal IS1, the second low-side switch M4 may be operated as a switch to be switched on/off on the basis of the second input signal IS2, which is the PWM signal, and the second high-side switch M2 may provide a return path of the current charged in the driving coil 50 when the second low-side switch M4 is switched off.

In addition, when the VCM is operated in an opposite direction, i.e., when a current flows to the driving coil 50 in the opposite direction, the second high-side switch M2 may be operated as a current source on the basis of the first input signal IS1, the first low-side switch M3 may be switched on/off on the basis of the second input signal IS2, which is the PWM signal, and the first high-side switch M1 may provide a return path.

In another example of an apparatus for driving an actuator a driving circuit may be controlled so that any one of first and second high-side switches M1 and M2 is driven in a PWM scheme, and any one of first and second low-side switches M3 and M4 is driven as a current source.

Referring to FIG. 7B, the first input signal IS1 and the output current flowing to the driving coil 50 are illustrated. The first input current and the output current Iavg represent linear characteristics similar to those in the linear scheme, and at the same time, a maximum current Imax and a minimum current Imin by a current ripple, which is a feature of PWM driving, appear.

The feature described above has an advantage in that non-linearity due to the discontinuous current mode (DCM) in a low current region does not exist, as compared to the PWM driving.

Figure 8A:
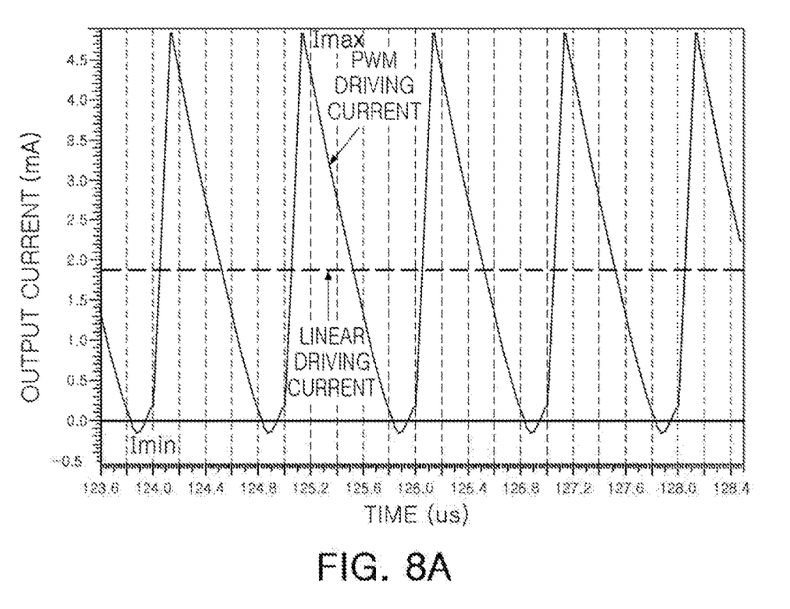
FIG. 8A is an example of waveform diagrams of time-output current of an apparatus for driving an actuator.
Figure 8B:
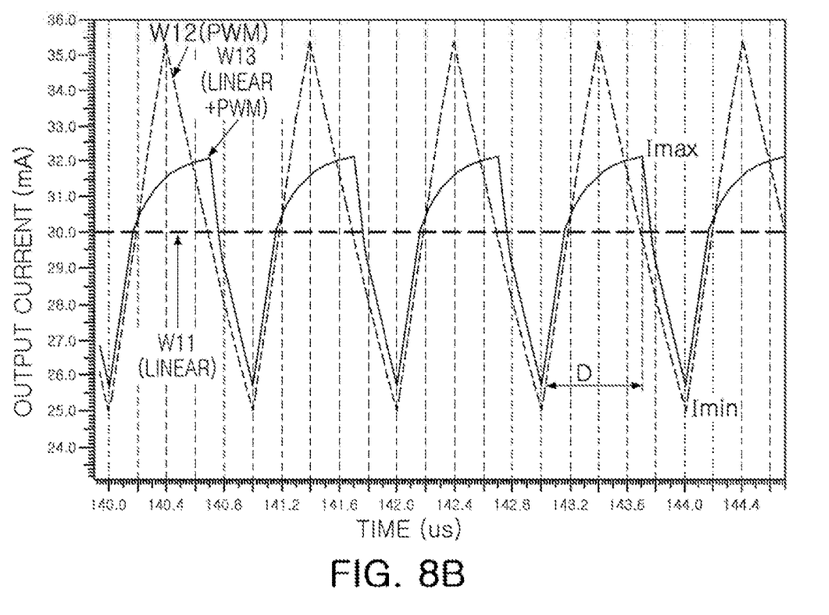
FIG. 8B is waveform diagrams of time-output current according to an example described herein.
Figure 8C:
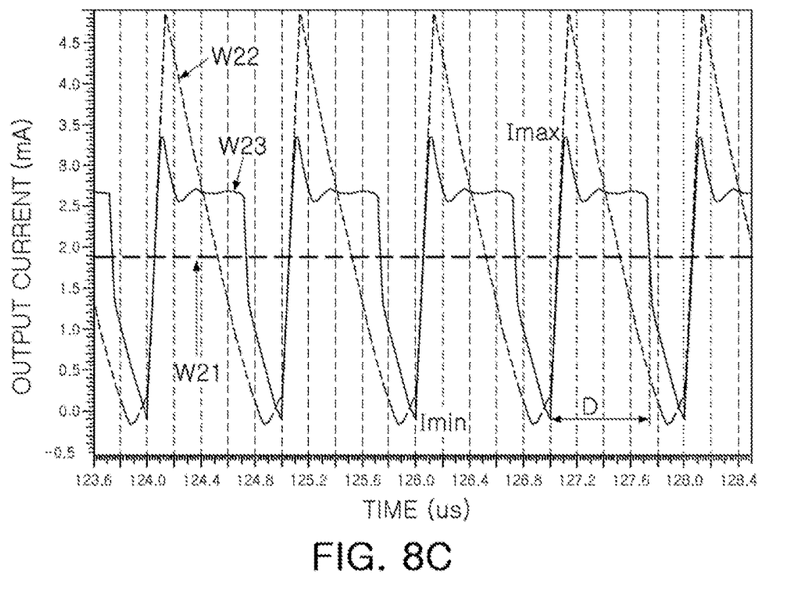
FIG. 8C is an waveform diagrams of time-output current according to an example described herein.

FIG. 8A is an example of waveform diagrams of time-output current of an apparatus for driving an actuator, FIG. 8B is waveform diagrams of time-output current according to an example described herein, and FIG. 8C is another waveform diagrams of time-output current according to an example described herein.

In FIGS. 8B and 8C, W11 and W21 are output currents by linear driving, W12 and W22 are output currents by PWM driving, and W13 and W23 are currents by both of linear driving and PWM driving.

Referring to FIGS. 7A and 8A, in a relation between the input signal and the output current illustrated in FIG. 7A, a discontinuous current mode (DCM) section appears in the region in which the average current Iavg is small. Referring to FIG. 8A, the reason is that a discontinuous current mode (DCM) section in which a current of an inductor drops up to zero is generated.

FIG. 8B are views for comparison between wavelengths according to the present disclosure and the related art when an average current of the inductor is a specific value (30 mA), FIG. 8C are views for comparison between wavelengths according to the present disclosure and the related art when an average current of the inductor is a specific value (1.8 mA).

Referring to FIGS. 8B and 8C, the present disclosure has an advantage in that the non-linearity due to the DCM in the low current region does not exist, as compared to the PWM driving, and the maximum current Imax and the minimum current Imin may be reduced depending on setting of a duty (D) as compared to the PWM to reduce driving noise of the actuator due to the current ripple. In addition, a consumed current may be changed depending on the second input signal, i.e., the duty (D). Therefore, the consumed current may have a relationship of a consumed current of the linear driving>a consumed current of the present disclosure>a consumed power of the PWM driving.

Figure 9:
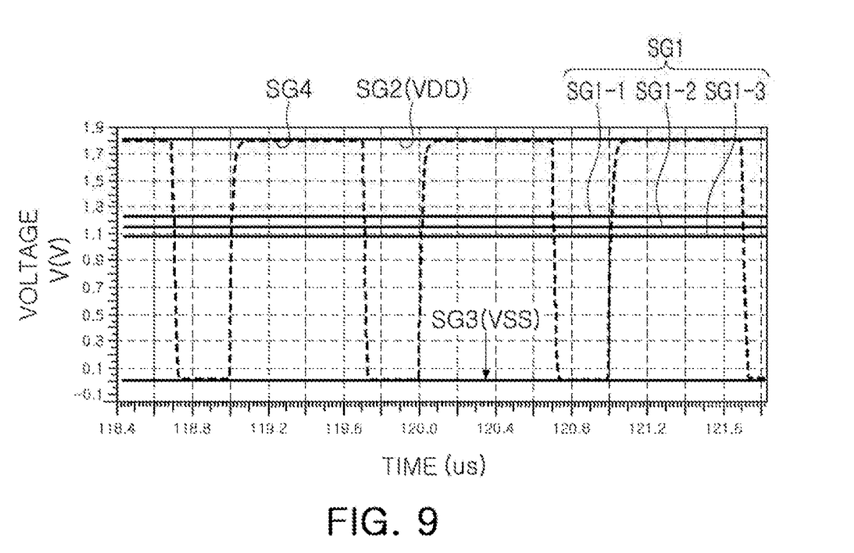
FIG. 9 illustrates examples of waveform diagrams of first and second input signals in each time.
Figure 10:
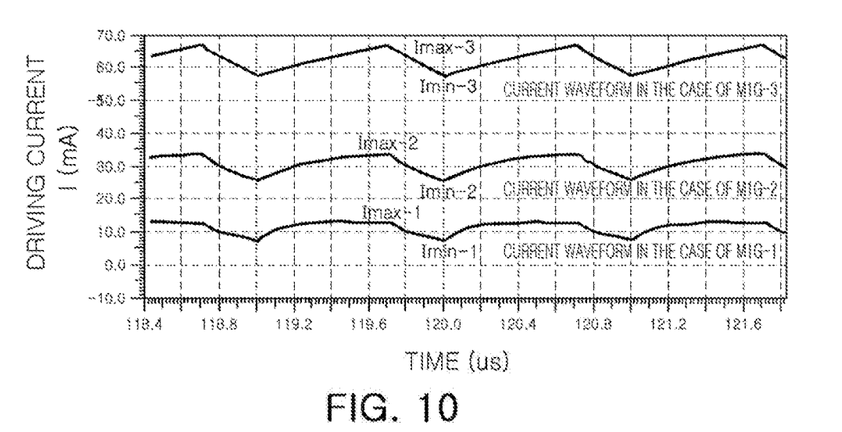
FIG. 10 illustrates examples of waveform diagrams of driving signals in each time apparatus.

FIG. 9 illustrates examples of waveform diagrams of first and second input signals in each time, and FIG. 10 illustrates examples of waveform diagrams of driving signals in each time apparatus.

Referring to FIG. 9, the first gate signal SG1 that is linearly controlled may appear as SG1-1, SG1-2, and SG1-3 having different voltage levels depending on the first input signal IS1. In an example, when the first input signal IS1 is two bits, the first gate signal SG1 may correspond SG1-1 if a two-bit value of the first input signal is 00, may correspond to SG1-2 if a two-bit value of the first input signal is 01, and may correspond to SG1-3 if a two-bit value of the first input signal is 10.

A source-gate voltage of the first high-side switch M1 may be a difference voltage between the first power supply voltage VDD and a voltage of the first gate signal SG1, and may be converted into a current value by transconductance of the first high-side switch M1.

In addition, a voltage of the fourth gate signal SG4 of which turn-on/off are controlled by the second input signal IS2 may repeat an active level (for example, VDD) and a non-active level (for example, VSS). Here, when a period is T and an on-duty is D, as an example, the period T may be 1 μsec and the on-duty D may be 0.7. In addition, the second gate signal SG2 may become a non-active level (for example, VDD), such that the second high-side switch M2 may be in a switch-off state, and the third gate signal SG3 may be a non-active level (for example, VSS) and the first low-side switch M3 may thus be in a switch-off state.

Referring to FIG. 10, the driving current may be changed depending on the period and the duty of the fourth gate signal SG4 between the maximum current Imax and the minimum current Imin according to SG1-1, SG1-2, and SG1-3 corresponding to the change in the first input signal IS1. As an example, when the first input signal IS1 is binary seven bits, a size of a decimal number may correspond to 0 to 127. Referring to a relationship between the first input signal IS1 and the output current illustrated in FIG. 10, input and output characteristics may be changed depending on setting of the second input signal IS2, i.e., the duty D.

Figure 11:
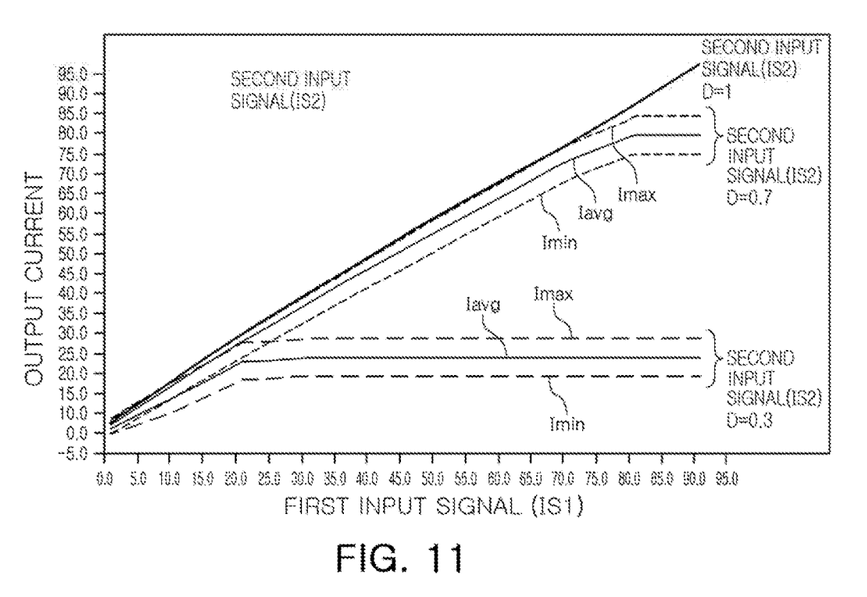
FIG. 11 is an example of a diagram illustrating relationships between first and second input signals and an output signal.

FIG. 11 is an example of a diagram illustrating relationships between first and second input signals and an output signal.

In the graphs illustrated in FIG. 11, a horizontal axis indicates a decimal number value of the first input signal IS1 which is digital, and a vertical axis indicates a decimal number value of the output current (the driving current).

The graphs illustrated in FIG. 11 are graphs illustrating relationships between input and output characteristics depending on, for example, three duties D (0.3, 0.7, and 1.0). As an example, when D=1, the apparatus for driving an actuator may have the same characteristics as those of the linear scheme, and as D is set to be reduced, the maximum driving current may be limited. When D=0, the second low-side switch M4 may be maintained in a switch-off, such that the driving current becomes 0.

As an example, when the first input signal IS1 is set and fixed to a maximum value and the second input signal IS2 is controlled, the apparatus for driving an actuator may have the same driving characteristics as those of the PWM scheme.

According to the examples as described above, both of the linear driving and the PWM driving may be used to enable relative optimization. Therefore, noise may be significantly reduced and linearity between the input and the output may be improved by controlling magnitudes of the consumed current and the current ripple. In addition, both of the linear scheme and the PWM scheme may be used, such that an optimized driving scheme in which characteristics of both of the linear scheme and the PWM scheme is provided.

As set forth above, both of the linear scheme and the PWM scheme may be used to drive the VCM, such that characteristics of the linear scheme and the PWM scheme may be implemented, an attempt to optimize driving depending on applications is possible, and the linear driving, the PWM driving, or both of the linear driving and the PWM driving may be selected.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for driving an actuator, comprising:
a driving coil configured to generate magnetic force;
a control circuit configured to provide a first control signal and a second control signal; and
a driving circuit comprising a high-side switch and a low-side switch connected to the driving coil, the high-side switch and the low-side switch configured to generate driving signals based on the first and second control signals, respectively, and to provide the driving signals to the driving coil, wherein the control circuit is further configured to control the driving circuit so that the high-side switch is operated as a current source using the first control signal, and to control the driving circuit so that the low-side switch is driven in a pulse width modulation (PWM) scheme using the second control signal.

2. The apparatus for driving an actuator of claim 1, wherein the control circuit comprises:
a gate signal generating circuit configured to generate the first control signal and the second control signal based on first and second input signals; and
a detecting circuit configured to detect feedback signals corresponding to the driving signals flowing to the driving coil and to provide the feedback signals to the gate signal generating circuit, and
the gate signal generating circuit is further configured to control the first control signal and the second control signal based on the feedback signals.

3. The apparatus for driving an actuator of claim 2, wherein the control circuit is further configured to set a voltage level of the first control signal based on the feedback signal within a current source condition range to operate the high-side switch as the current source.

4. The apparatus for driving an actuator of claim 1, wherein the control circuit is further configured to provides the second control signal as a PWM signal to drive the low-side switch in the PWM scheme, and a period and a duty of the PWM signal are constant.

5. The apparatus for driving an actuator of claim 2, wherein the detecting circuit comprises:
a mirror switch connected to the high-side switch in a current mirror form; and
a detecting resistor connected between the mirror switch and a ground and detecting the feedback signal.

6. The apparatus for driving an actuator of claim 2, wherein the gate signal generating circuit comprises:
a first multiplexer configured to generate the first control signal on the basis of an error voltage between a reference voltage corresponding to the first input signal and the feedback signal; and
a second multiplexer configured to generate the second control signal on the basis of a second input signal having a constant period and duty.

7. An apparatus for driving an actuator, comprising:
a driving coil configured to generate magnetic force;
a control circuit configured to provide a first control signal including first and second gate signals and a second control signal including third and fourth gate signals; and
a driving circuit comprising a first high-side switch, a second high-side switch, a first low-side switch, and a second low-side switch connected to the driving coil, the first and second high-side switches and the first and second low-side switches being configured to generate driving signals depending on the first and second control, and to provide the driving signals to the driving coil,
wherein the control circuit is further configured to control the driving circuit so that one of the first and second high-side switches is operated as a current source using the first control signal, and to control the driving circuit so that one of the first and second low-side switches is driven in a pulse width modulation (PWM) scheme using the second control signal.

8. The apparatus for driving an actuator of claim 7, wherein the control circuit comprises:

a gate signal generating circuit configured to generate the first control signal and the second control signal; and
a detecting circuit configured to detect first and second feedback signals corresponding to the driving signals flowing to the driving coil and to provide the first and second feedback signals to the gate signal generating circuit, and
the gate signal generating circuit is further configured to control the first control signal and the second control signal depending on the first and second feedback signals.

9. The apparatus for driving an actuator of claim 8, wherein the control circuit is further configured to set a voltage level of the first control signal depending on one of the first and second feedback signals within a current source condition range to operate one of the first and second high-side switches as the current source.

10. The apparatus for driving an actuator of claim 7, wherein the control circuit is further configured to provide the second control signal as a PWM signal to drive one of the first and second low-side switches in the PWM scheme.

11. The apparatus for driving an actuator of claim 8, wherein the detecting circuit comprises:
first and second mirror switches connected, respectively, to the first and second high-side switches in a current mirror form; and
first and second detecting resistors connected, respectively, between the first and second mirror switches and a ground and being configured to detect, respectively, the first and second feedback signals corresponding to the driving signals.

12. The apparatus for driving an actuator of claim 8, wherein the gate signal generating circuit comprises:
a first multiplexer configured to generate the first control signal based on an error voltage between one of the first and second feedback signals and a reference voltage;
a second multiplexer configured to generating the second control signal based on the a second input signal having a constant period and duty;
a digital to analog converter (DAC) configured to provide the reference voltage corresponding to a first input signal;
a third multiplexer configured to provide one of the first and second feedback signals; and
an operational amplifier configured to provide an error voltage between the feedback signal selected by the third multiplexer and the reference voltage from the DAC to the first multiplexer.

13. The apparatus for driving an actuator of claim 8, wherein the first high-side switch and the first low-side switch are connected in series between a first power supply voltage terminal and a second power supply voltage terminal.

14. The apparatus for driving an actuator of claim 13, wherein the second high-side switch and the second low-side switch are connected in series between the first power supply voltage terminal and the second power supply voltage terminal.

15. The apparatus for driving an actuator of claim 14, wherein a first end of the driving coil is connected to a first connection node between the first high-side switch and the first low-side switch, and a second end of the driving coil is connected to a second connection node between the second high-side switch and the second low-side switch.

16. The apparatus for driving an actuator of claim 13, wherein the first power supply voltage terminal has a positive voltage and the second power supply voltage terminal has a negative or zero voltage.

17. The apparatus for driving an actuator of claim 8, wherein the first and second gate signals have complementary voltage levels and the third and fourth gate signals have complementary voltage levels.

\* \* \* \* \*